(12) United States Patent
Murphy et al.

(10) Patent No.: US 12,110,133 B2
(45) Date of Patent: Oct. 8, 2024

(54) SPACECRAFT PROPELLANT LOADING SYSTEM

(71) Applicant: Maxar Space LLC, Palo Alto, CA (US)

(72) Inventors: Ashton Murphy, Santa Clara, CA (US); Giovanni Lenguito, New York, NY (US)

(73) Assignee: Maxar Space LLC, Palo Alto, CA (US)

( * ) Notice: Subject to any disclaimer, the term of this patent is extended or adjusted under 35 U.S.C. 154(b) by 286 days.

(21) Appl. No.: 17/714,845

(22) Filed: Apr. 6, 2022

(65) Prior Publication Data

US 2023/0322416 A1    Oct. 12, 2023

(51) Int. Cl.
*B64G 1/40* (2006.01)

(52) U.S. Cl.
CPC .................................. *B64G 1/402* (2013.01)

(58) Field of Classification Search
CPC .............................. B64G 1/402; B67D 7/3209
USPC .............................. 137/263, 255, 883; 141/1
See application file for complete search history.

(56) References Cited

U.S. PATENT DOCUMENTS

| | | | | |
|---|---|---|---|---|
| 3,391,881 | A * | 7/1968 | Maltby | B64G 1/646 |
| | | | | 285/317 |
| 4,741,502 | A * | 5/1988 | Rosen | B64G 1/402 |
| | | | | 244/158.9 |
| 5,071,093 | A | 12/1991 | Perdu | |
| 9,242,749 | B2 * | 1/2016 | Malone | B65B 3/17 |
| 10,336,475 | B1 * | 7/2019 | Delgado | B64G 1/405 |
| 2003/0037819 | A1 | 2/2003 | Mueller | |
| 2004/0000343 | A1 * | 1/2004 | Turan, Jr. | B25F 5/00 |
| | | | | 137/561 R |
| 2005/0051233 | A1 * | 3/2005 | Wodjenski | F17C 13/045 |
| | | | | 141/104 |
| 2017/0102110 | A1 * | 4/2017 | Lomax | F17C 5/06 |
| 2020/0108952 | A1 | 4/2020 | Swenson et al. | |

FOREIGN PATENT DOCUMENTS

| | | | | |
|---|---|---|---|---|
| FR | 3104672 | A3 * | 6/2021 | ............... F17C 5/06 |
| RU | 2653266 | C2 * | 5/2018 | |

OTHER PUBLICATIONS

FR 3104672 A3—English Translation (Year: 2021).*
RU2653266C2—English Translation (Year: 2018).*

* cited by examiner

*Primary Examiner* — Timothy L Maust
*Assistant Examiner* — Christopher M Afful
(74) *Attorney, Agent, or Firm* — Vierra Magen Marcus LLP

(57) ABSTRACT

An example of an apparatus includes an inlet to connect to a propellant source a pressure regulator connected to the inlet to reduce propellant pressure from a first pressure at the inlet to a second pressure. The apparatus includes a manifold connected to the pressure regulator to receive propellant from the pressure regulator at the second pressure and includes a plurality of manifold outlets. The apparatus further includes a plurality of gas lines, each gas line extending from a corresponding manifold outlet for connection to a corresponding satellite propellant tank.

20 Claims, 14 Drawing Sheets

1

SPACECRAFT PROPELLANT LOADING SYSTEM

BACKGROUND

The present disclosure relates to technology for spacecraft (e.g., satellite) propellant loading.

Satellites are widely used for a variety of purposes including communication, location (e.g., Global Positioning System, or GPS), and data gathering (e.g., directing sensors at the Earth including cameras, radar, laser, or other sensors). Different satellites may include different equipment according to the functions they are to fulfill. Satellites may be placed in orbit at different heights above the Earth and may be adapted for the location at which they are expected to operate. For example, Geostationary satellites may be different from Low Earth Orbit (LEO) satellites. In order to fulfill their functions, satellites may be maintained in a designated position with a designated orientation for long periods of time (e.g., throughout their working life) or change position and/or orientation one or more times. In some cases, a satellite may drift from its designated orbit and/or orientation and may be returned to its designated orbit and/or orientation by some movement of the satellite that may be linear (e.g., along x, y, z coordinates) and/or rotational (e.g., rotation about x, y, z coordinates). In some cases, a satellite may be moved in a linear and/or rotational manner to perform some new function (e.g., directing one or more antenna, sensor, or other component towards a different location). Satellites may be moved from their designated orbits at the end of their useful life. Such movement may be achieved using thrusters that are fired as required to achieve a specified movement. Propellant for one or more thrusters may be stored in a propellant tank that is loaded with propellant prior to launch.

DETAILED DESCRIPTION

Certain embodiments of the present technology described herein relate to spacecraft (e.g., satellites) and to propellant used by thrusters to move spacecraft while in space. Satellites may be moved for a variety of reasons while in space. A satellite may include thrusters configured to achieve such movement using a propellant. A propellant system may include one or more propellant tank that contains the propellant. The propellant may be loaded into the propellant tank(s) prior to satellite launch.

Examples of the present technology include a propellant loading system that allows multiple satellite propellant tanks to be loaded in parallel in an efficient manner. For example, propellant may flow through a manifold to a number of satellite propellant tanks in parallel. This may reduce time and resources needed for propellant loading, particularly where a large number of satellites are to be launched together. In an example, Krypton is used as the propellant and is supplied at high pressure (e.g., at an initial pressure of about 6000 pounds per square inch). Propellant loading may be automated using appropriate transducers (e.g., to measure pressure and/or weight of propellant in propellant tanks) and valves so that propellant flow to individual satellite propellant tanks may be independently controlled (e.g., stopped as the individual satellite propellant tank becomes full).

Prior to describing details of specific embodiments of the present technology, it is first useful to describe an exemplary wireless communication system with which embodiments of the present technology would be useful. An example of such a wireless communication system will now be described with reference to FIG. 1.

Figure 1:
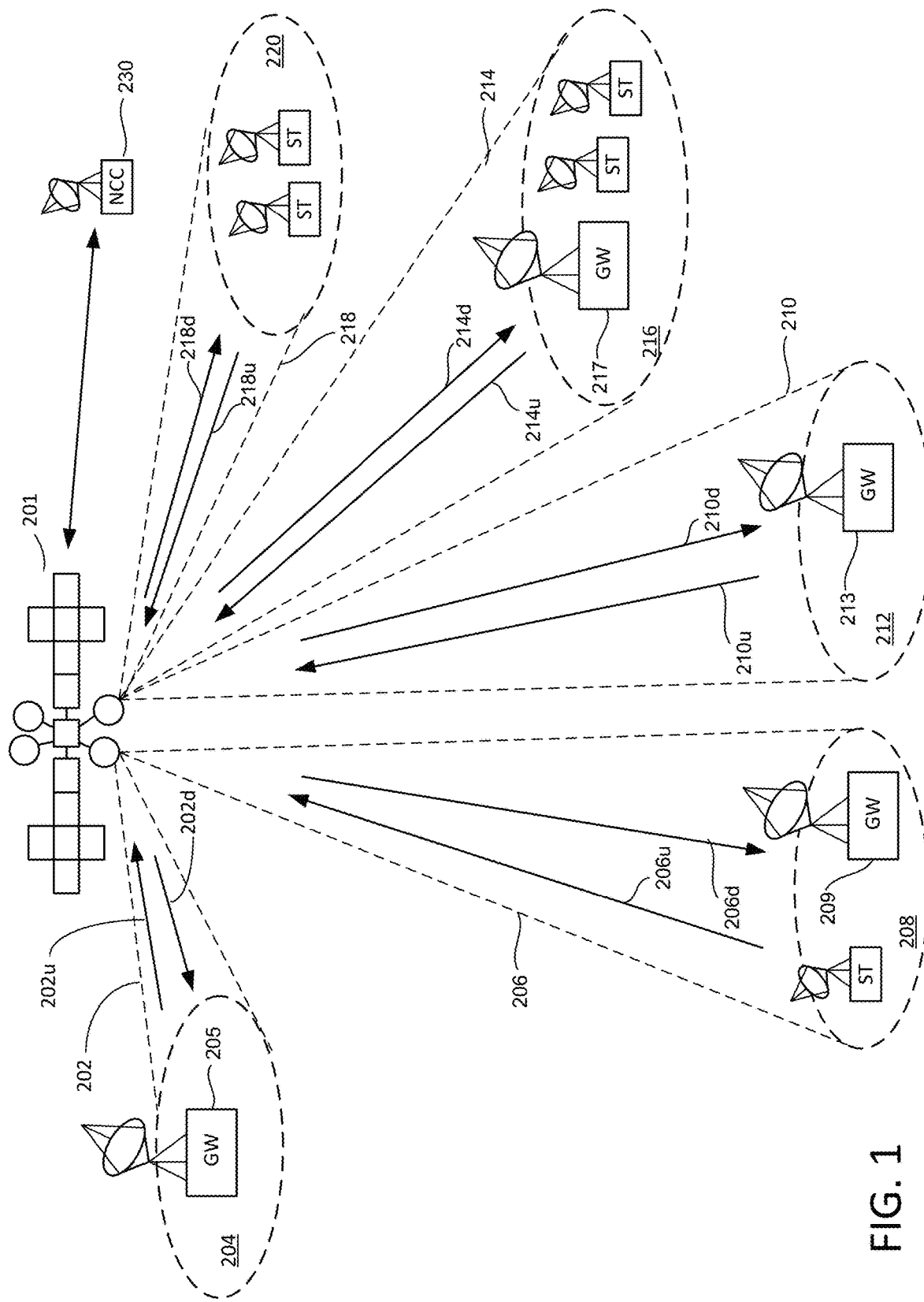
FIG. 1 shows an example of a satellite system.

FIG. 1 is a block diagram depicting a portion of a satellite communications system that includes one or more satellites. FIG. 1 depicts satellite 201, which may be a geostationary satellite or a non-geostationary satellite. A geostationary satellite moves in a geosynchronous orbit (having a period of rotation synchronous with that of the Earth's rotation) in the plane of the Equator, so that it remains stationary in relation to a fixed point on the Earth's surface. This orbit is often achieved at an altitude of 22,300 miles (35,900 km) above the earth; however, other altitudes can also be used. A non-geostationary satellite is a satellite that is not a geostationary satellite and is not in an orbit that causes the satellite to remain stationary in relation to a fixed point on the Earth's surface. Examples of non-geostationary satellites include (but are not limited to) satellites in Low Earth Orbits ("LEO"), Medium Earth Orbits ("MEO") or Highly Elliptical Orbits ("HEO"). Although FIG. 1 only shows one satellite, in some embodiments, the system will include multiple satellites that are referred to as a constellation of satellites, which may communicate with each other.

A subscriber terminal is a device that wirelessly communicates with a satellite, usually to be used by one or more end users. The term subscriber terminal may be used to refer to a single subscriber terminal or multiple subscriber terminals. A subscriber terminal is adapted for communication with the satellite communication system including satellite 201. Subscriber terminals may include fixed and mobile subscriber terminals including, but not limited to, a cellular telephone, wireless handset, a wireless modem, a data transceiver, a paging or position determination receiver, or mobile radiotelephone, a cellular backhaul, a trunk, an enterprise computing or storage device, an airborne device, a maritime device, or a head end of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, a terminal or a mobile.

The term gateway may be used to refer to a device that communicates wirelessly with a satellite and provides an interface to a network, such as the Internet, a wide area network, a telephone network or other type of network. In some embodiments, gateways manage the subscriber terminals.

FIG. 1 also shows a Network Control Center 230, which includes an antenna and modem for communicating with satellite 201, as well as one or more processors and data storage units. Network Control Center 230 provides commands to control and operate satellite 201, as well as all other satellite communication payloads in the constellation. Network Control Center 230 may also provide commands to any of the gateways (via a satellite or a terrestrial network) and/or subscriber terminals.

In one embodiment, satellite 201 is configured to spot beams that use time domain beam hopping among the spot beams. In one embodiment, the hopping beams are divided into hopping groups such that one beam in each group is active at a given time. In addition to the non-articulated spot beams that perform time domain beam hopping, one embodiment of satellite 201 includes 4.2 degree steerable spot beams used to communicate with gateways. Additionally, satellite 201 includes 2.8 degree steerable spot beams which can have a dual purpose of communicating with gateways and/or providing high capacity communication for subscriber terminals that would otherwise fall under the hopping beams of the spot beams performing time domain beam hopping. Other embodiments can use different sized spot beams.

For example, FIG. 1 shows five spot beams: 202, 206, 210, 214 and 218. Spot beam 202 is a 4.2 degree steerable spot beam that illuminates coverage area 204 for communicating with one or more gateways 205 via downlink 202d and uplink 202u. Spot beam 206 is a 2.8 degree steerable dual-purpose beam that illuminates coverage area 208 in order to communicate with one or more gateways 209 and one or more subscriber Terminals ST via downlink 206d and uplink 206u. Spot beam 210 is a 2.8 degree steerable spot beam that could be used to communicate with gateways and/or subscriber terminals ST, but in the example of FIG. 1 spot beam 210 illuminates coverage area 212 to communicate with one or more gateways 213 via downlink 210d and uplink 210u. The spot beams that perform time domain beam hopping can be used to communicate with subscriber terminals and/or gateways. Spot beams 214 and 218 are two examples of the non-articulated spot beams that perform time domain beam hopping. Spot beam 214 illuminates coverage area 216 to communicate with one or more gateways 217 and one or more subscriber terminals ST via downlink 214d and uplink 214u. Spot beam 218 illuminates coverage area 220 to communicate with subscriber terminals ST via downlink 218d and uplink 218u.

Figure 2:
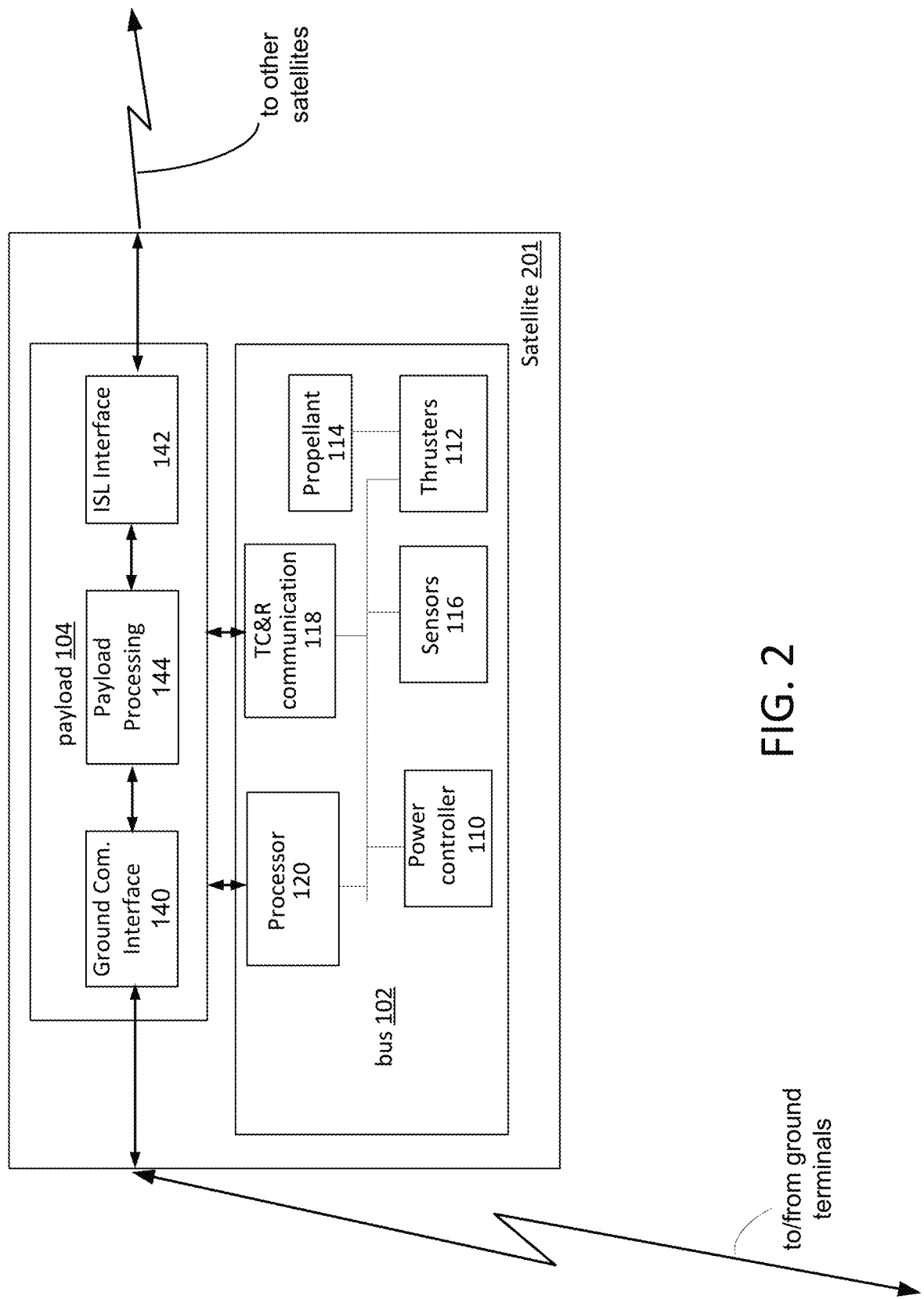
FIG. 2 shows an example of a satellite.

FIG. 2 is a block diagram of one embodiment of satellite 201 of FIG. 1. In one embodiment, satellite 201 includes a bus 102 and a payload 104 carried by bus 102. Some embodiments of satellite 201 may include more than one payload. The payload provides the functionality of the communication and/or processing systems described herein.

In general, bus 102 is the spacecraft that houses the payload. For example, the bus components include a power controller 110, which may be connected to solar panels and one or more batteries (not shown in FIG. 2) to provide power to other satellite components; thrusters 112; propellant tank 114; sensors 116; telemetry, command and ranging (T, C & R) communication and processing equipment 118; and processor 120. Other equipment can also be included. Solar panels, batteries, and power controller 110 are used to provide power to satellite 100. Thrusters 112 are used for changing the position or orientation of satellite 100 while in space. Propellant tank 114 contains propellant for the thrusters. Sensors 116 are used to determine the position and orientation of satellite 100. T, C & R communication and processing equipment 118 includes communication and processing equipment for telemetry, commands from the ground to the satellite and ranging to operate the satellite. Processor 120 is used to control and operate satellite 201. An operator on the ground can control satellite 201 by sending commands via T, C & R communication and processing equipment 118 to be executed by system processor 120. For example, in response to a command, T, C & R communication and processing equipment 118 may cause one or more of thrusters 112 to fire, which may cause propellant from propellant tank 114 to flow to the selected thrusters. Some embodiments include a Network Control Center that wirelessly communicates with T, C & R communication and processing equipment 118 to send commands and control satellite 201. In one embodiment, processor 120 and T, C & R communication and processing equipment 118 are in communication with payload 104.

In one embodiment, the payload 104 includes an antenna system (not depicted in FIG. 2) that provides a set of one or more beams (e.g., spot beams) comprising a beam pattern used to receive wireless signals from ground stations and/or other satellites, and to send wireless signals to ground stations and/or other satellites. Payload 104 also includes payload components such as Ground Communication Interface 140, Inter-satellite Communication Interface 142 and Payload Processing System 144. Ground Communication Interface 140, which is connected to the antenna system (not depicted), is configured to communicate with one or more ground terminals (e.g., send and receive messages to/from gateways and/or subscriber terminals). Inter-satellite Communication Interface 142, which is connected to the antenna system, is configured to communicate with other satellites, e.g., via an in-space network.

Figure 3:
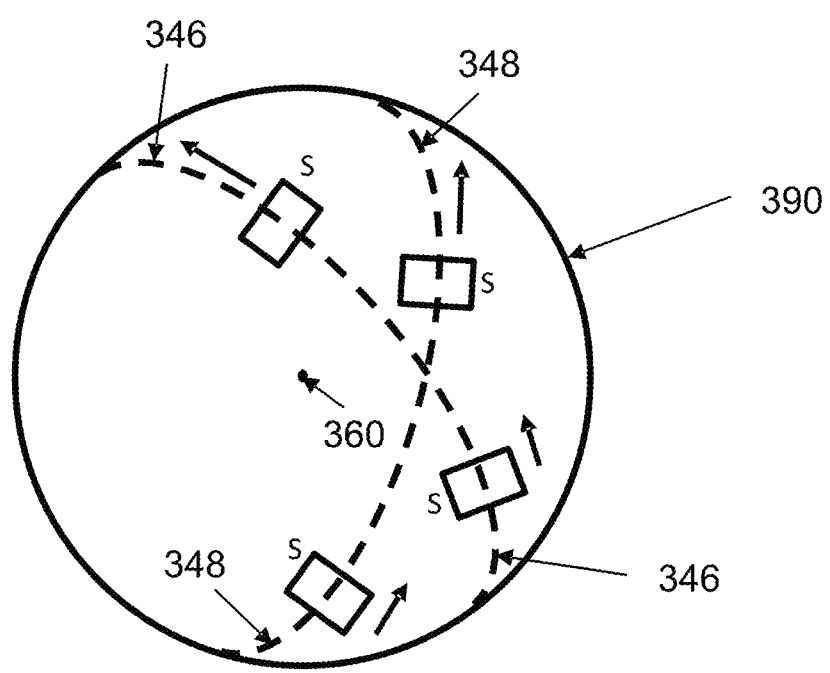
FIG. 3 shows an example of a satellite constellation orbiting Earth.

FIG. 3 depicts a constellation of satellites S (e.g., satellite 201 or other satellite) in orbit around the Earth 390. In one embodiment, each of the satellites of the constellation depicted in FIG. 3 can be Low Earth Orbit (LEO) satellites. (In other embodiments, the satellites can be Medium Earth Orbit (MEO) satellites. Other types of satellites (and other distances from the earth) can also be used including Geostationary or Geosynchronous (GEO) satellites. Surrounding the Earth 390 are a set of planes such as planes 346 and 348 shown in FIG. 3 (just two planes are shown for clarity, it will be understood that any suitable number of planes may be provided), each representing an orbit around the Earth. FIG. 3 also shows a plurality of satellites S representing the constellation of satellites. Each satellite of the constellation is orbiting the Earth 390 in one of the planes 346, 348. In one embodiment, the constellation of satellites S includes satellite 201 of FIG. 2. The arrangement of planes 346, 348 and other planes (not shown) may provide continuous coverage of the entire Earth, or a substantial portion of the Earth (e.g., omitting Arctic and Antarctic regions). Planes may form "streets of coverage" with satellites following each other as they orbit so that before a satellite disappears from view another satellite appears over the horizon.

The satellites S of the constellation depicted in FIG. 3 may be configured to wirelessly communicate with other satellites (e.g., neighbors) and/or ground terminals and/or gateways. Satellites S may be configured to gather data from antennas or sensors directed towards the Earth (e.g., cameras, or radiation detectors at any wavelength, infrared, radar, etc.). Satellites S may be configured to generate signals used to determine location (e.g., GPS) or other purposes.

A satellite S may be launched from Earth and placed in a desired orbit with a desired orientation to perform its function or functions (e.g., to maintain coverage of a designated area or areas as illustrated in FIG. 2). Over time, a satellite may drift from its desired orbit and/or orientation so that it can no longer perform its function(s) in a satisfactory manner. One or more thrusters (e.g., thrusters 112) may be provided to move such a satellite back to its desired orbit and/or orientation. Such thrusters may be fired according to a thruster firing pattern that is calculated to produce a specified movement to return the satellite to its desired orbit and/or orientation (orbital station-keeping).

In some cases, a satellite's desired orbit and/or orientation may change after it is launched (e.g., to perform some new function or to orient one or more satellite components towards a new target). Such a change or may require a movement of the satellite and a corresponding specified movement may be calculated and corresponding thruster firing pattern selected to achieve the specified movement (orbital maneuver).

In some cases, a service satellite may be used to service a target satellite to provide some external intervention. For example, a service satellite may dock with a target satellite so that it can refuel the target satellite (e.g., provide propellant and/or electrical current) and/or perform repair/replacement of components of the target satellite. In some cases, a service satellite may attach to a target satellite and may move the target satellite in a linear and/or rotational manner. In order to achieve a successful docking of a service satellite and target satellite, accurate movement of one or both may be required (e.g., to avoid damaging impact and/or misalignment, relative movement may be finely controlled).

The above examples of satellite movement (e.g., for returning to a desired orbit and/or orientation, changing to a new orbit and/or orientation, and facilitating docking of two or more satellites) should not be construed as limiting and the present technology may be applied to a thruster system used for movement of a satellite or other spacecraft for any purpose.

Figure 4:
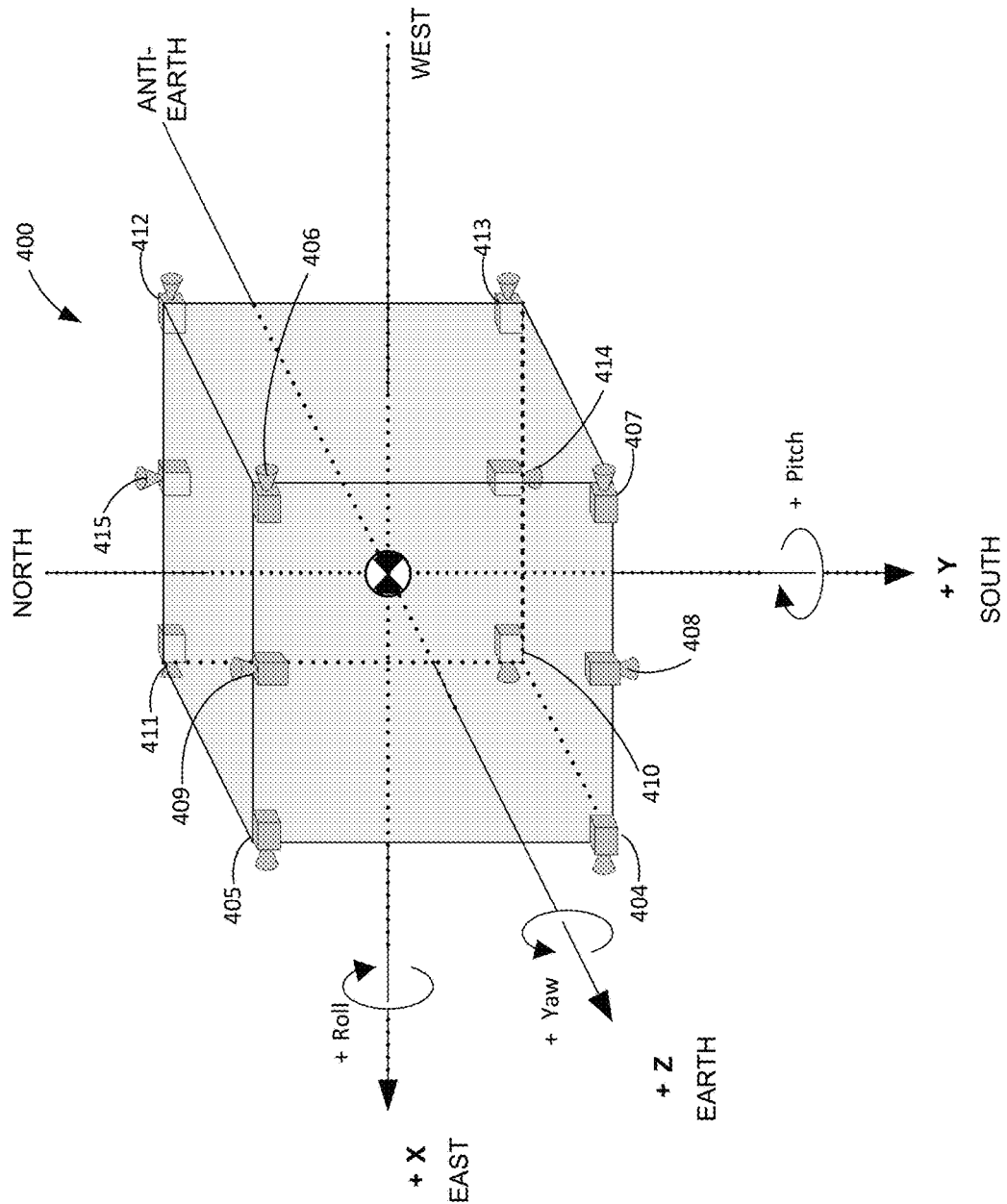
FIG. 4 shows an example of a satellite with thrusters.

FIG. 4 illustrates an example of a satellite 400 (e.g., satellite 201 or any of satellites S) that includes a plurality of thrusters (e.g., thrusters 112) to facilitate movement of satellite 400, including linear movement and rotational movement. Satellite 400 is illustrated as a cube for simplicity (the present technology is not limited to any particular satellite shape or configuration and is not limited to a cube satellite or "CubeSat"). Thrusters may be physically attached to a frame, housing, or other component of satellite 400 so that force generated by thrusters results in movement of satellite 400.

Satellite 400 is shown in perspective view with the X-direction extending across the view shown from right to left (with the +X to the left). The X-direction is along the west to east direction in this example (e.g., parallel to a line of latitude). The Y-direction extends downwards in this view (with +Y towards the bottom). The Y-direction is along the north to south direction in this example (e.g., parallel to a line of longitude). The Z-direction extends generally from back to front in this view (with +Z towards the front). The Z-direction is along the anti-earth to earth direction in this example (e.g., directed towards the center of the earth). Movement along any combination of the X, Y, and/or Z directions (west-east, north-south, and/or earth/anti-earth) may be considered linear motion. Arrows indicating the X-direction, Y-direction, and Z-direction intersect in the center of satellite 400 in this example and these arrows also correspond to X, Y, and Z axes respectively for purposes of describing rotational movement. For example, rotation about the X-axis may be referred to as "roll," rotation about the Y-axis may be referred to as "pitch," and rotation about the Z-axis may be referred to as "yaw." Satellite 400 may experience linear movement in one or more of the three dimensions (along X, Y, Z directions) illustrated and rotational movement about any of the three axes illustrated (about X, Y, Z axes) so that satellite may be considered to have six degrees of freedom (6 DOF).

Twelve thrusters are provided to implement linear and rotational movement of satellite 400 (e.g., to provide movement with six degrees of freedom) in this example. In other examples, satellites may use different numbers of thrusters and the present technology is not limited to satellites with any number or configuration of thrusters. Four thrusters are located at vertices of satellite 400 at corners of an earth-facing side, with east-facing thruster 404 at the southeast corner, east-facing thruster 405 at the northeast corner, west-facing thruster 406 at the northwest corner, and west-facing thruster 407 at the southwest corner. In addition, south-facing thruster 408 is located midway along the south edge and north-facing thruster 409 is located midway along the north edge of the earth-facing side. A similar arrangement is provided on the opposite side (anti-earth side) with east-facing thruster 410 at the southeast corner, east-facing thruster 411 in the northeast corner, west-facing thruster 412 in the northwest corner, and west-facing thruster 413 in the southwest corner. In addition, south-facing thruster 414 is located midway along the south edge and north-facing thruster 415 is located midway along the north edge of the anti-earth face. The number, locations, and orientations of thrusters in FIG. 4 are provided as an example and it will be understood that any suitable number of thrusters may be arranged in different locations and orientations according to the present technology. Furthermore, while satellite 400 is shown in a particular orientation, it will be understood that satellite 400 may be rotated to have a different orientation which may provide different thruster orientations (e.g., changing pitch by 90 degrees may bring thrusters 406, 407, 412, 413, which are shown as west-facing, into an earth-facing orientation).

Satellite thrusters (e.g., thrusters 404-415 of FIG. 4) may use a propellant to generate thrust. In some examples, a fuel and an oxidizer may be combined (burned) in a thruster to generate thrust. Both fuel and oxidizer may be considered as propellants. In some cases, a single propellant may be used. For example, some ion thrusters use a noble gas, such as Xenon or Krypton as a propellant, with ions of Xenon or Krypton being ejected from a thruster at high velocity to generate thrust. Sufficient propellant for an extended operational life may be provided in a satellite prior to launch.

Figure 5:
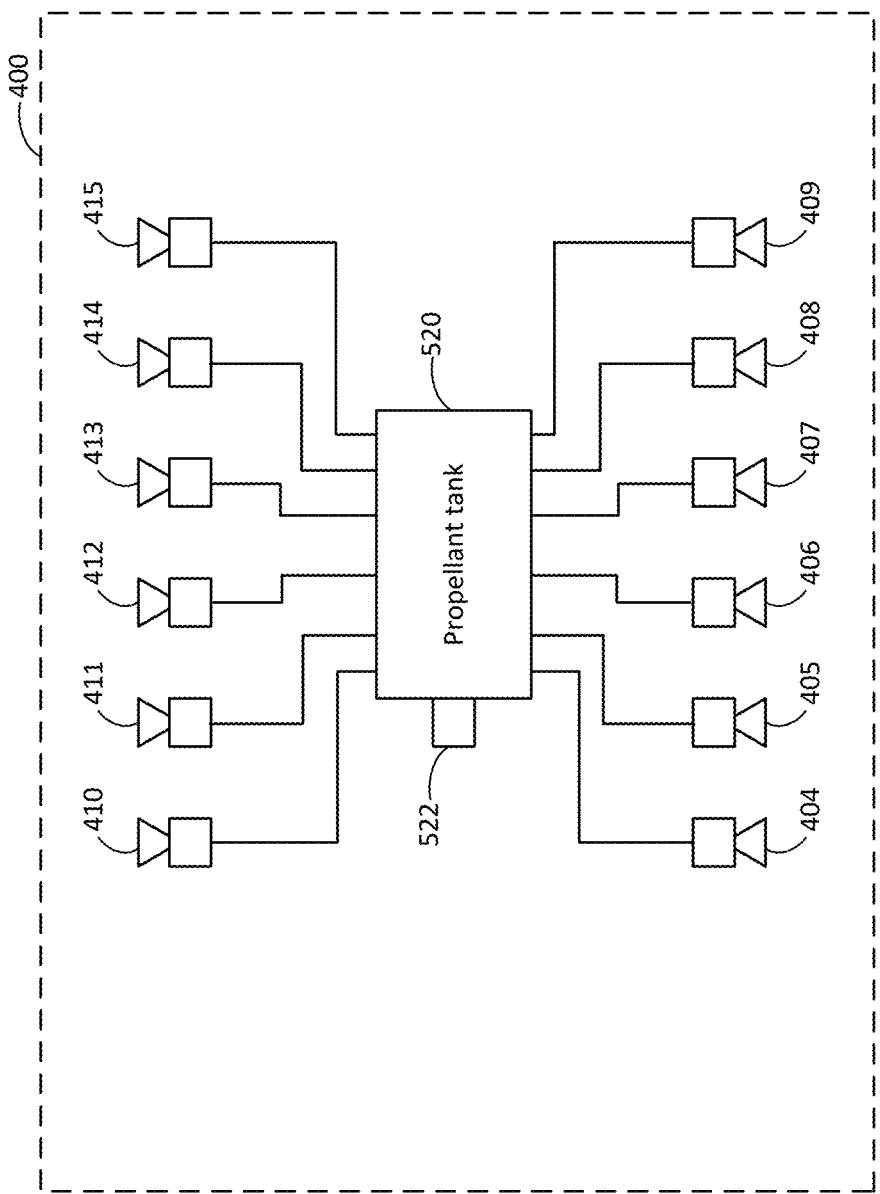
FIG. 5 shows thrusters connected to a propellant tank.

FIG. 5 shows a schematic illustration of thrusters 404-415 connected to propellant tank 520 in satellite 400. Propellant tank 520 has a fill valve 522 (fill/drain valve) to allow propellant tank 520 to be filled with propellant. Propellant tank 520 may be filled (loaded) with propellant via fill valve 522 prior to launch so that it contains sufficient propellant for some predetermined period (e.g., for an expected amount of usage over the useful lifetime of the satellite). For example, propellant tank 520 may have an interior volume (water volume) of between 10 liters and 60 liters in some satellite examples. Fill valve 522 may have a threaded fitting or other features for physical connection with a propellant loading system.

While resupplying of satellites in orbit is possible in some cases, it is common to load a satellite prior to launch in a one-time loading operation that loads sufficient propellant for a satellite's usable lifespan. Aspects of the present technology are applicable to one-time loading operations and to loading of satellites that may subsequently be refueled in space. Additional components (not shown) may be provided in a satellite thruster system including valves to control propellant flow from propellant tank 520 to thrusters 404-415 and control circuits to control such valves according to a firing pattern and the present technology is not limited to any particular configuration of a satellite thruster system. While the examples shown in the present document refer to satellites, the present technology is not limited to satellites and may be applied to other spacecraft such as interplanetary probes.

Figure 6:
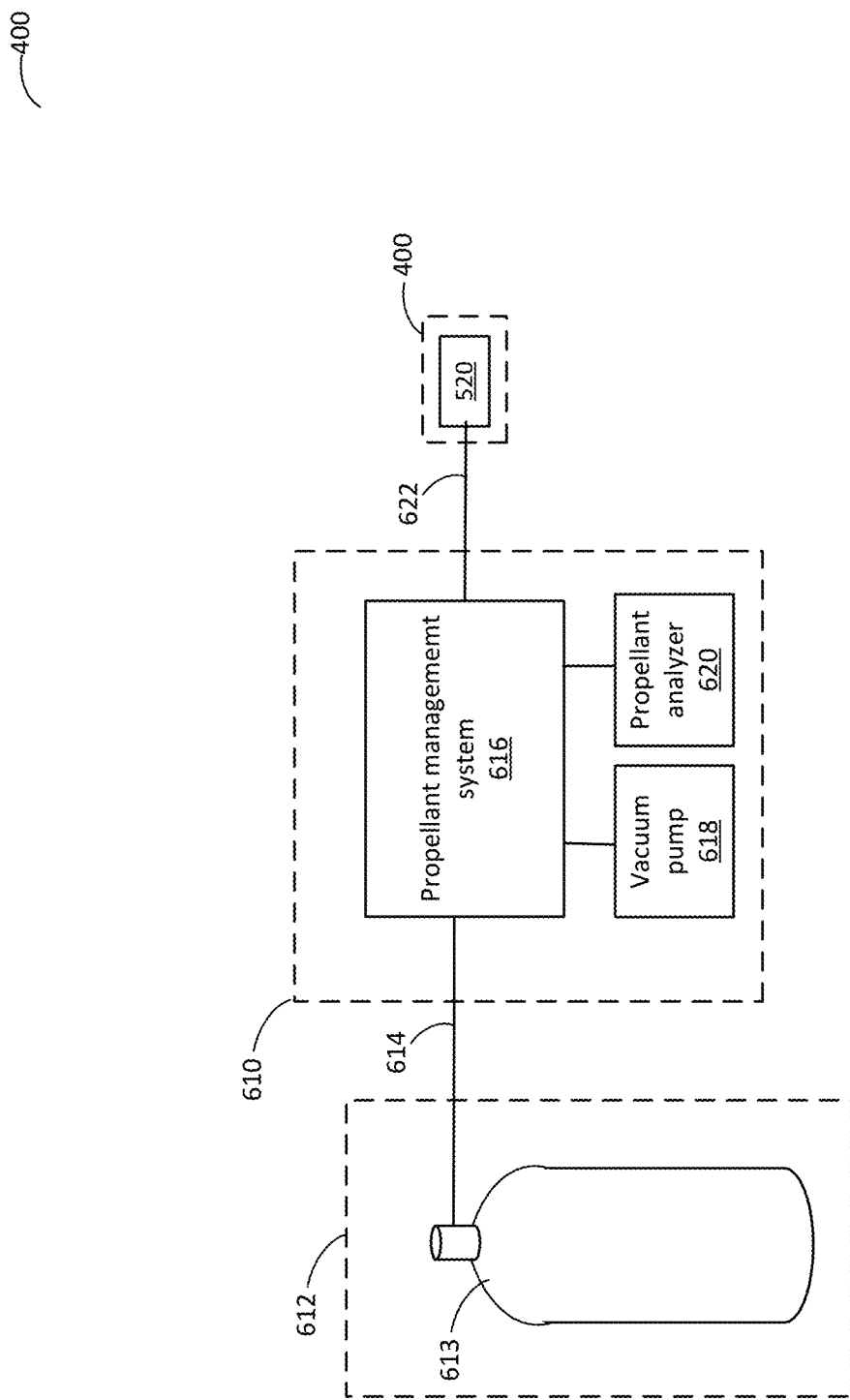
FIG. 6 shows an example of a system for loading propellant in a satellite propellant tank.

FIG. 6 shows an example of a propellant loading system 610 for loading propellant into propellant tank 520 of satellite 400. Propellant loading system 610 is connected to propellant source 612 by a gas line 614. Propellant source 612 is shown as a single propellant tank 613 (e.g., a tank of Xenon or Krypton) in this example. In other examples, a propellant may include one or more valves and/or regulators (not shown) to control flow of propellant from propellant source 612 to propellant loading system 610. In some cases, two or more propellant tanks may be provided as a propellant source. In some cases, a compressor (not shown) may be included in a propellant source in order to increase pressure of a propellant (e.g., to provide propellant to propellant loading system 610 at a pressure that is higher than in propellant tank 613).

Propellant loading system 610 includes a propellant management system 616, vacuum pump 618 and propellant analyzer 620. Propellant management system 616 may manage flow of propellant, for example, by controlling propellant pressure in gas line 622 from propellant loading system 610 to propellant tank 520. Vacuum pump 618 may enable pumping down (evacuating) of interior volumes of propellant management system 616 (and, in some cases, gas line 614 and/or gas line 622 and/or propellant tank 520) to sub-atmospheric pressures. Propellant analyzer 620 may be configured to perform analysis of propellant that is being loaded into propellant tank 520 (e.g., propellant in propellant management system 616 or gas line 622). While propellant loading system 610 may be convenient for loading a single propellant tank of a single satellite (e.g., propellant tank 520 of satellite 400), in some cases, there may be multiple propellant tanks to load (e.g., where a satellite has two or more propellant tanks and/or multiple satellites are to be loaded with propellant). For example, in some cases, multiple satellites may be launched together in a launch vehicle and may require loading with propellant prior to launch. Examples of such satellites include proliferated Low Earth Orbit (pLEO) satellites, which may be launched in large numbers (e.g., more than a hundred in a single launch vehicle) and which may be loaded with propellant in similarly large numbers. Sequentially loading propellant one satellite at a time using a system such as propellant loading system 610 may be time consuming and labor intensive and may not be compatible with high-volume low-cost operation.

Figure 7A:
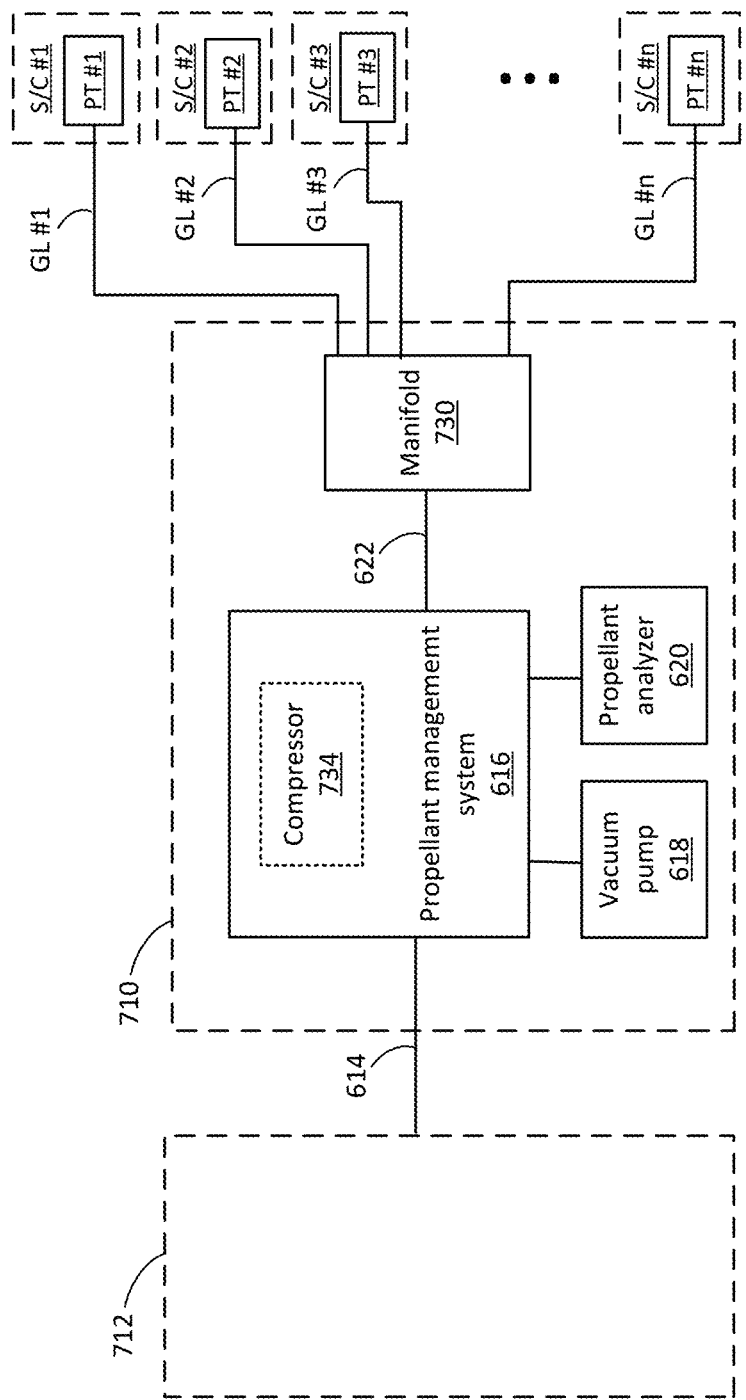
FIGS. 7A-E show examples of systems for loading propellant in multiple satellite propellant tanks.

FIG. 7A shows an alternative arrangement that includes propellant source 712 connected to propellant loading system 710, which is connected to multiple propellant tanks (PTs), n propellant tanks in this example, including PT #1, PT #2, PT #3 . . . PT #n, where n may be any number greater than one (e.g., 2, 3, 4, 5 . . . ). Propellant tanks PT #1, PT #2, PT #3 . . . PT #n are shown in n corresponding spacecraft (S/C), including S/C #1, S/C #2, S/C #3 S/C #n. The arrangement shown allows loading of propellant in propellant tanks PT #1-PT #n of corresponding spacecraft (e.g., satellites) S/C #1-S/C #n in parallel. For example, from 2 to 30 propellant tanks of 30 satellites may be loaded with propellant in parallel, which may provide a corresponding reduction in propellant loading time by a factor of 2 to 30. In an example, all satellites that are to be launched together in a launch vehicle (which may include over a hundred satellites) may be loaded with propellant in parallel. In other examples, satellites may be loaded with propellant in batches (e.g., loading batches of 30 propellant tanks at a time). The present technology is not limited to any particular number of propellant tanks or satellites.

While FIG. 7A shows propellant tanks PT #1, PT #2, PT #3 . . . PT #n in spacecraft S/C #1, S/C #2, S/C #3 S/C #n, in some cases propellant tanks may be loaded outside of corresponding spacecraft (e.g., separate loading of propellant tanks, or of thruster assemblies that include propellant tanks, prior to inclusion of the propellant tanks or thruster assemblies in respective spacecraft during an assembly procedure).

Propellant loading system 710 includes manifold 730, which is connected to propellant management system 616 by gas line 622 to receive propellant, and which connects with propellant tanks PT #1, PT #2, PT #3 . . . PT #n via corresponding gas lines (GLs), including GL #1, GL #2, GL #3 GL #n to enable flow of propellant to each of propellant tanks PT #1, PT #2, PT #3 . . . PT #n in parallel. Gas lines GL #1-GL #n may be flexible gas lines (hose type gas lines) with suitable fittings to allow attachment to propellant tanks PT #1-PT #n. Propellant loading system 710 may be implemented in various ways using a variety of components examples of which are described below. Propellant management system 616 may include (optional) compressor 734. Compressor 734 may increase propellant pressure from a first pressure to a second pressure in propellant management system 616 (e.g., a higher pressure than in gas line 614). In this way, propellant may be supplied via gas line 622 through manifold 730 to gas lines GL #1-GL #n at a pressure that remains relatively high as the amount of propellant in propellant source 712 diminishes and propellant pressure drops accordingly and while the amount of propellant in a receiving propellant tank or tanks (e.g., propellant tanks PT #1-PT #n) increases and propellant pressure increases accordingly.

In some examples, propellant loading system 710 may be mobile (e.g., may include wheels, or may be placed on a cart or other wheeled vehicle) so that it can be moved to an appropriate location for loading propellant into propellant tanks (e.g., propellant tanks PT #1-PT #n). For example, such a cart may be moved to locations in an assembly/test area of a satellite production facility to allow parallel loading of propellant in multiple satellites as part of a pre-launch assembly/test procedure. Gas lines GL #1-GL #n may be sufficiently long to accommodate n satellites in their locations in an assembly/test area (e.g., satellites may remain in their bays and may not have to be moved for propellant loading).

Propellant tanks PT #1-PT #n may be identical (e.g., same volume) or may be different (e.g., different volumes). Propellant tanks may be located on the same level (e.g., same distance above a floor) for uniformity when filling or may be at different levels. Gas lines GL #1-GL #n may have identical lengths or may be different (e.g., to accommodate differently located propellant tanks). In one example, all propellant tanks PT #1-PT #n are located at the same height above a floor and all gas lines GL #1-GL #n are of identical length to facilitate uniform filling of propellant tanks PT #1-PT #n. For example, propellant tanks PT #1-PT #n may be located around propellant loading system 710 at equal distances so that gas lines GL #1-GL #n extend from propellant loading system 710 in a "starfish" arrangement.

Propellant source 712 may be implemented by a single tank of propellant (e.g., propellant tank 613 of propellant source 612) or in some other manner. FIG. 7B shows an example implementation of propellant source 712 that includes a single propellant tank 613 by gas line 732. In an example, propellant tank 613 is a 45 liter tank that is filled with Krypton to an initial pressure of about 6000 pounds per square inch.

Figure 7C:
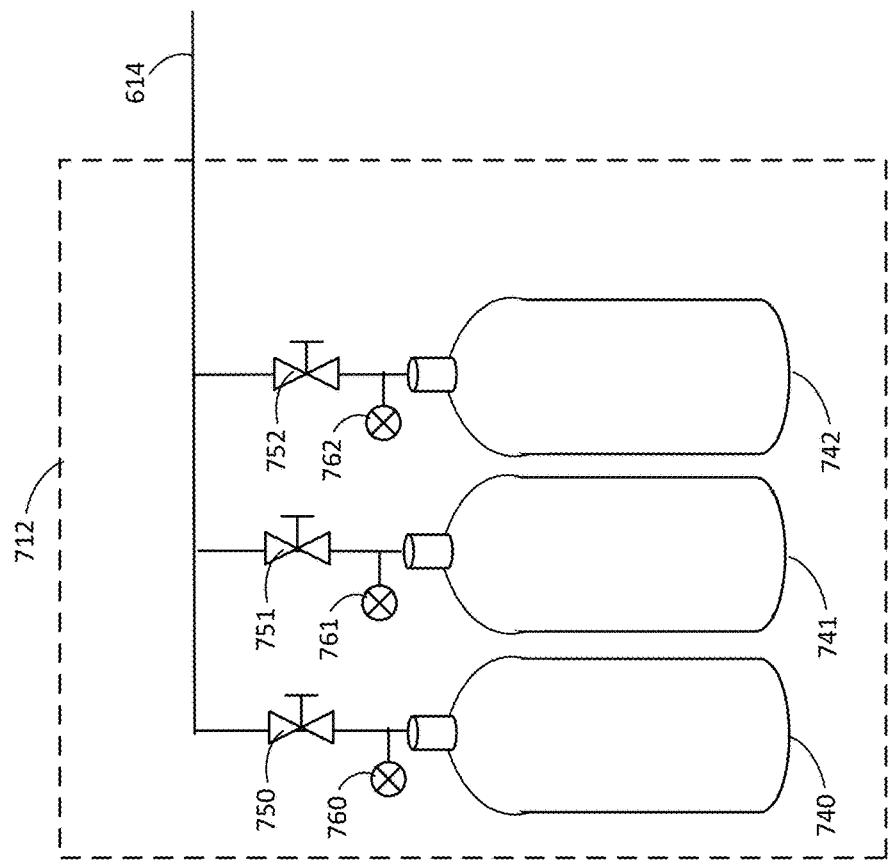
Figure 7B:
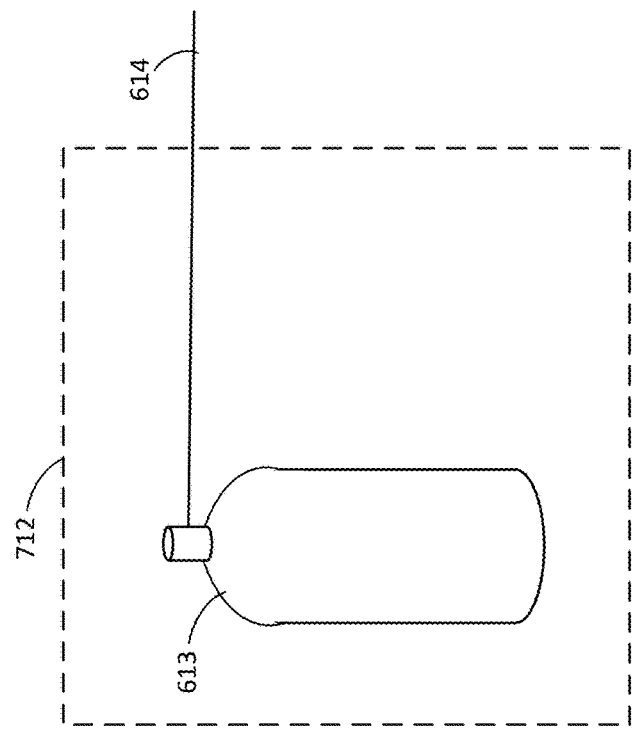

FIG. 7C shows an alternative implementation of propellant source 712, which includes three propellant tanks 740-742 connected in a cascade arrangement that enables propellant to be supplied at an appropriate pressure via gas line 614. Propellant tank 740 is connected to gas line 614 via valve 750, propellant tank 741 is connected to gas line 614 via valve 751 and propellant tank 742 is connected to gas line 614 via valve 752. Propellant pressure in propellant tank 740 is measured by pressure gauge 760, propellant pressure in propellant tank 741 is measured by pressure gauge 761 and propellant pressure in propellant tank 742 is measured by pressure gauge 762. In the cascade arrangement shown, propellant is initially drawn from a propellant tank with the lowest pressure (e.g., propellant tank 740) by opening valve 750 and closing valves 751, 752. Propellant flows from propellant tank 740 until pressure in a receiving propellant tank or tanks increases to a certain pressure (e.g., equal, or close to the pressure in propellant tank 740) at which time valve 750 is closed and propellant is drawn from the propellant tank with the next lowest pressure (e.g., propellant tank 741) by opening valve 751. Propellant flows from propellant tank 741 until pressure in a receiving propellant tank or tanks increases to a certain pressure (e.g., equal, or close to the pressure in propellant tank 741) at which time valve 751 is closed and propellant is drawn from the propellant tank with the next lowest pressure (e.g., propellant tank 742) by opening valve 752. Thus, each successive propellant tank is used to increase the pressure in the receiving tank or tanks until a desired level is achieved. This approach may be used with more than three propellant tanks connected in a cascade arrangement. In an example, each of propellant tanks 740-742 is a 45 liter tank filled with Krypton to an initial pressure of about 6000 psi.

While valves 750-752 may be manual valves and gauges 760-762 may provide a visual indication of pressure on a display, in some cases, automatic valves may be used (e.g., electrically controlled, pneumatically controlled, or otherwise controlled by a control circuit) and gauges may include transducers to measure pressure and provide an electrical signal indicating the measured pressure (e.g., analog or digital signal to a control circuit). Instead of gauges 760-762 (or in addition) scales may be used to measure the weight of each propellant tank so that the amount of propellant remaining in each tank can be estimated and tanks may be used until the remaining propellant reaches a predetermined amount (at which time the next tank may be started). Operation of propellant source 712 in the cascade arrangement of FIG. 7C may be automated so that valves 750-752 for propellant tanks 740-742 are switched automatically by appropriate control circuits (not shown) in response to changing pressure measurements (e.g., from gauges 760-762 and/or additional gauges to measure propellant pressure and/or flow at or near a receiving propellant tank).

Figure 7D:
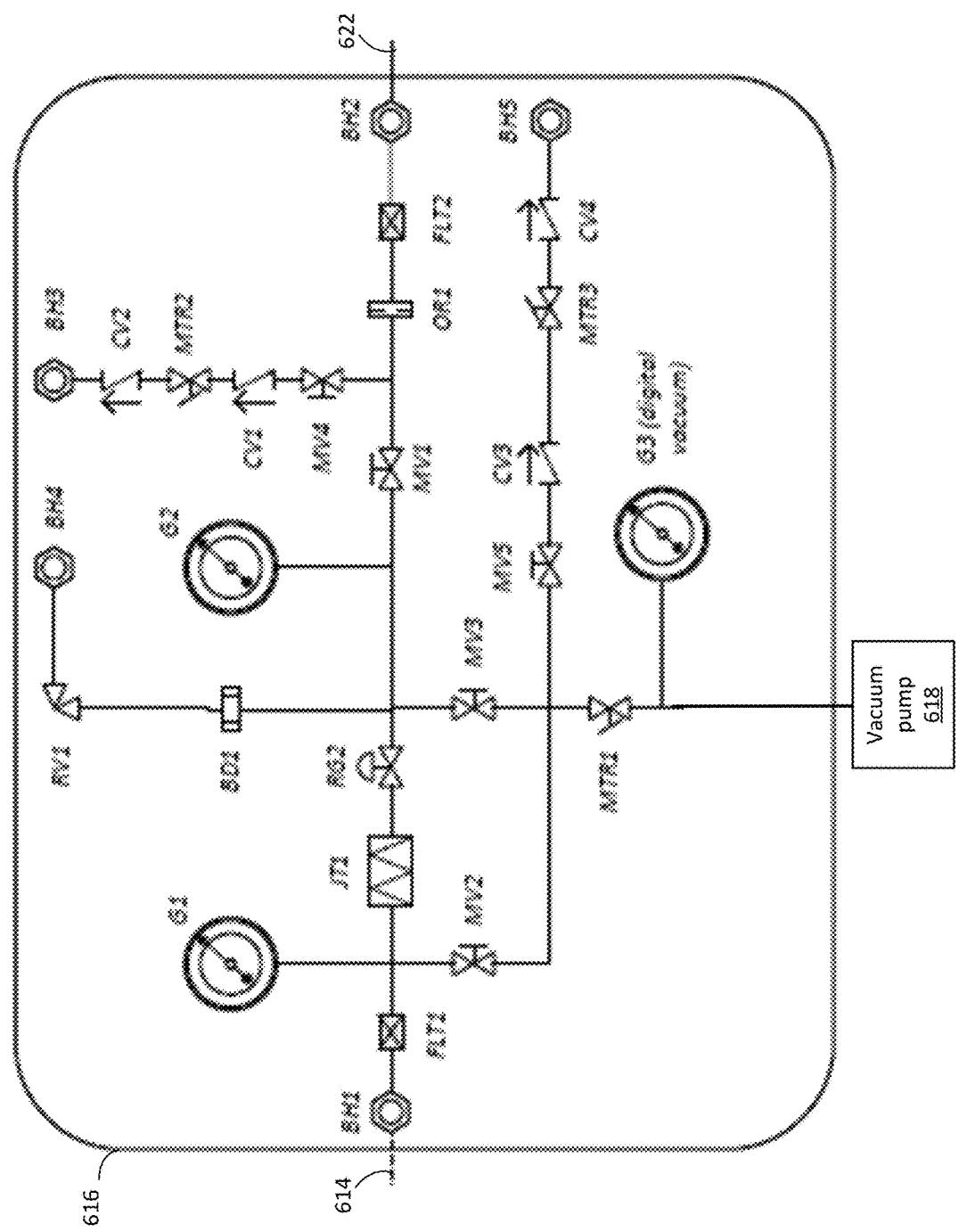

FIG. 7D shows an example implementation of propellant management system 616 configured to control flow of propellant from an inlet (e.g., inlet connected to gas line 614, which may be connected to propellant source 712) to an outlet (e.g., outlet connected to gas line 622 which may be connected to manifold 730). Propellant management system 616 includes a first bulkhead BH1 (e.g., a 4AN bulkhead), which may be considered an inlet of propellant management system 616 in this example. First bulkhead BH1 may allow connection/disconnection of gas line 614 to propellant management system 616. First bulkhead BH1 is connected in series with a first filter FLT1, a heater JT1, and a pressure regulator RG2. Pressure regulator RG2 may decrease propellant pressure from a first pressure (upstream pressure) in gas line 614 to a second pressure (downstream pressure) in gas line 622. A first pressure gauge G1 measures upstream pressure and a second pressure gauge G2 measures downstream pressure. A first manual valve MV1 (isolation valve for spacecraft), fixed orifice OR1 and second filter FLT2 connect regulator RG2 to a second bulkhead BH2 (outlet of propellant management system 616 in this example), which connects to gas line 622 (which may connect to manifold 730). A compressor (e.g., compressor 734) may be connected between regulator RG2 and first manual valve MV1 (or other suitable location) to increase propellant pressure provided to gas line 622. A burst disk BD1 (rupture disk) and first relief valve RV1 connect pressure regulator RG2 to a fourth bulkhead BH4, which may allow release of propellant in case propellant pressure exceeds a limit. A second manual valve MV2 and third manual valve MV3 connect either side of pressure regulator RG2 (upstream and downstream respectively), via first metering valve MTR1, to vacuum pump 618. Vacuum pump 618 may be any suitable pump or pumps, for example, a turbo pump with appropriate backing pump such as a scroll pump. In some examples, vacuum pump 618 may be integrated into propellant management system 616 and may be movable with propellant management system 616 (e.g., implemented on a common cart). A third pressure gauge G3 measures pressure at vacuum pump 618. A fourth manual valve MV4, first check valve CV1, second metering valve MTR2 and second check valve CV2 are connected in series between manual valve MV1 and a third bulkhead BH3 to allow venting of propellant (or other gas) from downstream of first manual valve MV1. A fifth manual valve MV5, third check valve CV3, third metering valve MTR3 and fourth check valve CV4 are connected between manual valve MV3 and a fifth bulkhead BH5 to allow venting of propellant (or other gas) from upstream and/or downstream of regulator RG2 (using second and third manual valves MV2 and MV3).

In operation, propellant may flow from gas line 614 through first filter FLT1, heater JT1 and regulator RG2, which reduces propellant pressure from a first pressure (upstream pressure) measured by gauge G1 to a second (lower) pressure (downstream pressure) measured by gauge G2. Propellant then flows through orifice OR1, second filter FLT2 and out through second bulkhead BH2 to gas line 622 (e.g., to PT #1-PT #n).

In order to avoid contamination of propellant during loading, propellant management system 616 may be filled with a cleaning gas (e.g., argon, Ar) to a suitable pressure (e.g., 30 psi) and may be pumped down by vacuum pump 618 to a sub-atmospheric pressure (e.g., in the millitorr range). Second manual valve MV2 and third manual valve MV3 may be opened to connect vacuum pump 618 to both sides of regulator RG2 for pumping out (alternatively, only one side may be pumped down). Filling with cleaning gas and pumping to sub-atmospheric pressure may be repeated to remove any contaminants that may remain along interior surfaces of components of propellant management system in a series of pump-purge cycles. First manual valve MV1 may be open during such pump-purge cycles to allow pumping and purging of gas line 622, manifold 730 and gas lines GL #1-GL #n.

Figure 7E:
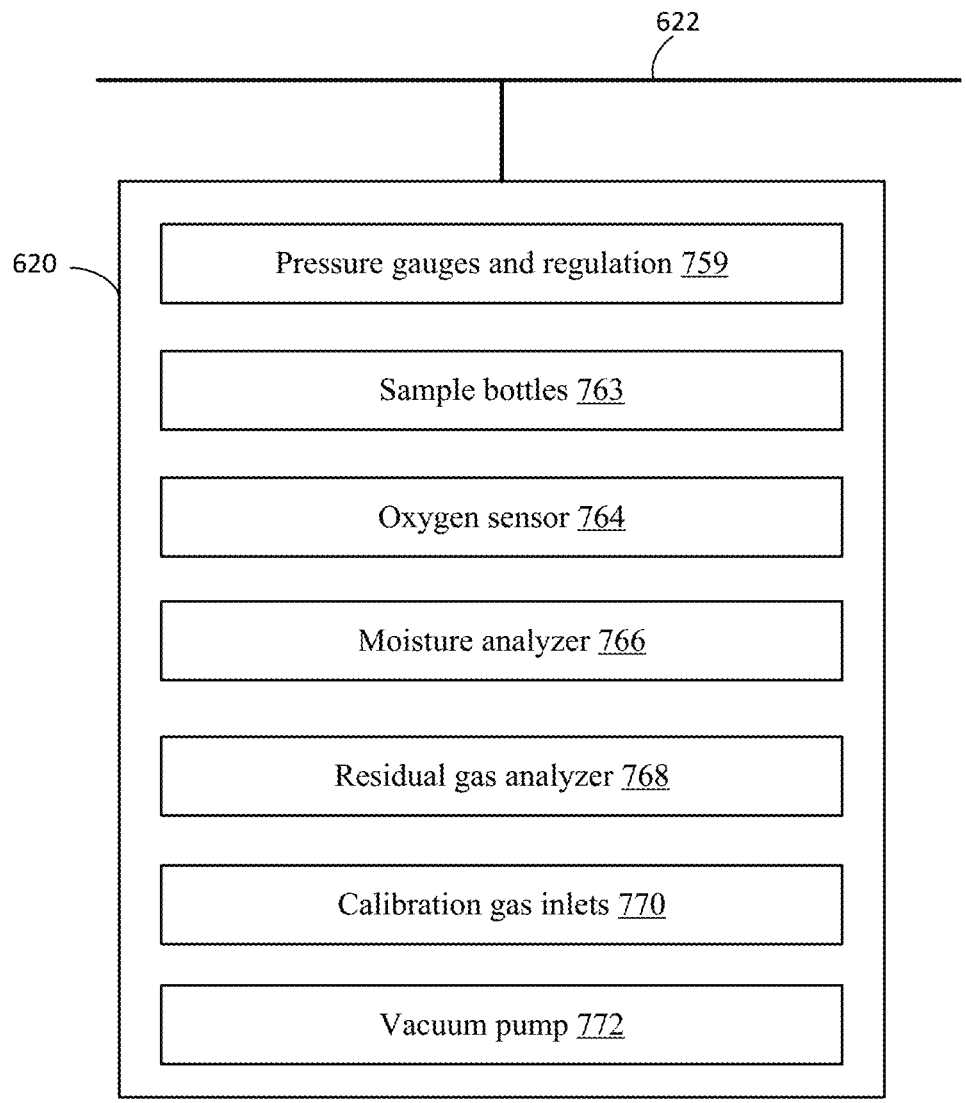

FIG. 7E illustrates an example implementation of propellant analyzer 620, which is connected to gas line 622 (or connected at some point within propellant management system 616, e.g., between regulator RG2 and second bulkhead BH2). Propellant analyzer 620 includes pressure gauges and regulation system 759 to regulate propellant flow to other components of propellant analyzer 620 so that propellant is at a suitable pressure. Sample bottles 763 may be filled with propellant (e.g., by pressure gauges and regulation system 759). For example, four bottles may be filled with propellant and may be used as samples for testing prior to satellite launch (e.g., off-site testing that may require some time). Oxygen sensor 764 may detect the amount of oxygen that is present in propellant in real time so that propellant loading may be stopped in response to detection of oxygen above a predetermined limit. Moisture analyzer 766 may detect the amount of moisture (water) that is present in propellant in real time so that propellant loading may be stopped in response to detection of moisture above a predetermined limit. Residual gas analyzer 768 may include a mass spectrometer and/or other components to identify contaminants that may be present in propellant in real time so that propellant loading may be stopped in response to detection of a contaminant, or contaminants, above specified threshold levels. Calibration gas inlets 770 allow introduction of calibration gasses into propellant analyzer 620 to calibrate other components of propellant analyzer 620 (e.g., oxygen sensor 764, moisture analyzer 766, residual gas analyzer 768). Vacuum pump 772 provides low pressure to ensure propellant flows from gas line 622 into propellant analyzer 620 (e.g., to provide continuous flow so that analyzed propellant is representative of propellant currently in gas line 622). Vacuum pump 772 may be substantially similar to vacuum pump 618. Other, or different, components may be included in propellant analyzer 620 and the present technology is not limited to any particular propellant analyzer components.

In an embodiment, propellant analyzer 620 is a unit that is separate from propellant management system 616 and can be attached/detached from propellant management system 616 as required. In another embodiment, propellant analyzer 620 and propellant management system 616 may be combined and may both be provided on a cart, or in another form that allows them to be moved together (e.g., to a location where they may be connected to a plurality of satellite propellant tanks).

In an embodiment, manifold 730 connects gas line 622 to an interior volume of manifold 730 which has n manifold outlets, each connected to a different one of gas lines GL #1-GL #n. In an example illustrated in FIG. 8, manifold 730 includes n automated valves AV #1-AV #n at n manifold outlets so that the flow of propellant through manifold 730 to each of gas lines GS #1-GS #n may be individually controlled (e.g., turned on or off). For example, control circuit 880 may be connected to each of automated valves AV #1-AV #n and may individually turn on/off valves AV #1-AV #n (connections are not shown in FIG. 8). Each gas line GL #1-GL #n terminates at a corresponding connector CT #1-CT #n, which may be configured to couple to a propellant tank (e.g., to couple to fill valves 522 of propellant tanks PT #1-PT #n). Connectors CT #1-CT #n may have threaded surfaces or other features to enable connection/disconnection. Each gas line GL #1-GL #n also has a corresponding transducer TR #1-TR #n, which is attached to a corresponding gas line to provide information regarding the propellant in the corresponding gas line and/or propellant tank. For example, transducer TR #1 may provide information regarding propellant pressure in gas line GL #1, TR #2 may provide information regarding propellant pressure in gas line GL #2, and so on. Transducers TR #1-TR #n may be connected at or near connectors CT #1-CT #n to obtain information regarding propellant close to a corresponding propellant tank. In some cases, transducers TR #1-TR #n may be combined with corresponding connectors CT #1-CT #n. Each transducer TR #1-TR #n may provide information regarding propellant pressure and/or other information. For example, each transducer TR #1-TR #n may include scales to measure mass of propellant in corresponding propellant tanks to enable simultaneous mass measurement. In some cases, temperature or other conditions may be measured by transducers TR #1-TR #n either in addition to, or instead of pressure and/or mass. In an example, each of transducers TR #1-TR #n is connected to control circuit 880 (connection not shown) and provides pressure, mass and/or other information to control circuit 880, which may be used to control automated valves AV #1-AV #n. For example, in response to an individual transducer (e.g., transducer TR #2) indicating a predetermined propellant pressure and/or mass that corresponds to a "full" propellant tank, control circuit 880 may send a command to corresponding automated valve AV #2 to turn off, thereby stopping propellant flow in corresponding gas line GL #2 to a propellant tank. In this way, as individual propellant tanks reach the predetermined level (become full) at different times (e.g., due to different gas line lengths, different propellant tank sizes, obstructions, height variations and/or other factors) propellant flow is automatically shut off to full propellant tanks while loading of other propellant tanks continues. In some cases, transducers TR #1-TR #n monitor temperature to identify freezing and potential icing, which may trigger shut off of propellant in a corresponding gas line and/or may trigger an alarm or warning.

Figure 8:
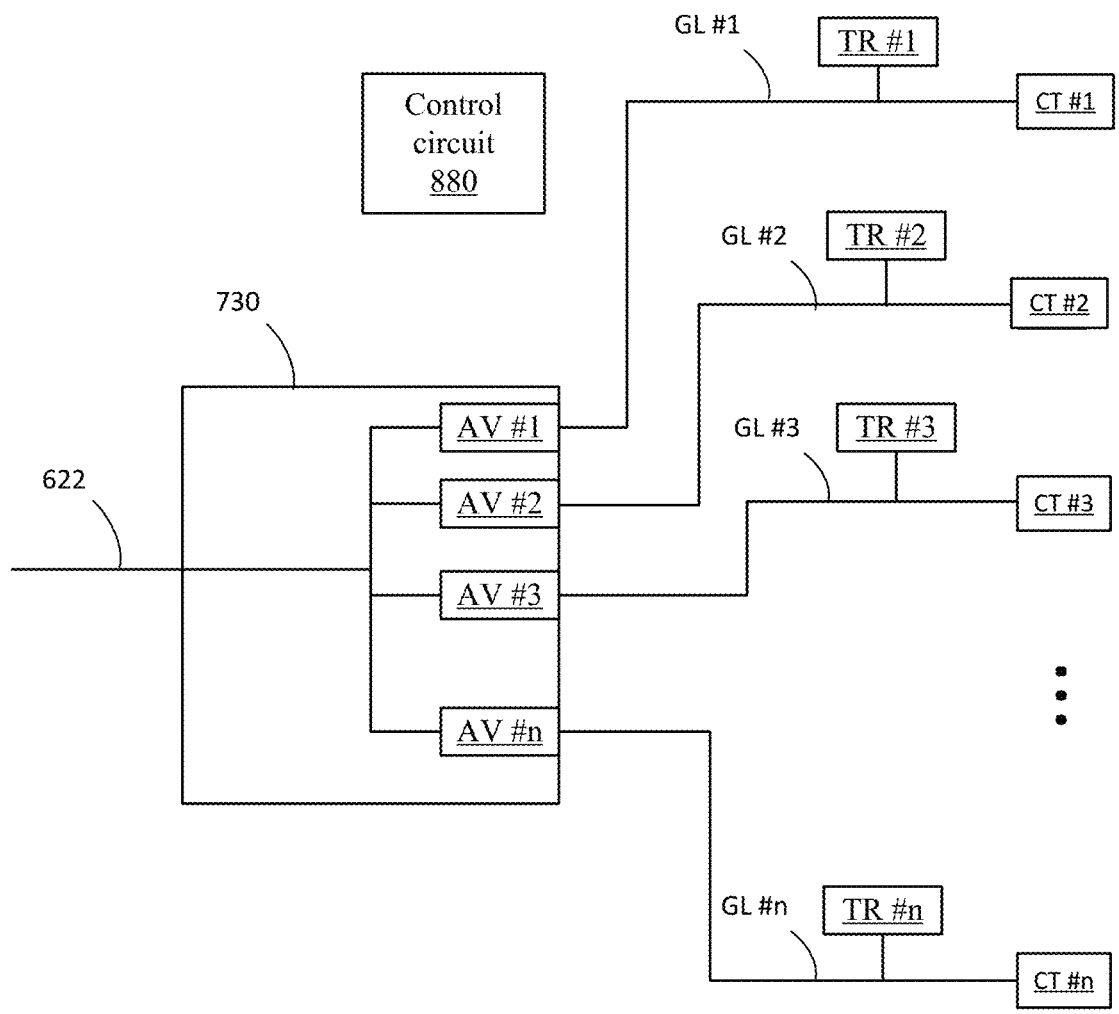
FIG. 8 shows an example of a manifold with valves to control gas flow.
Figure 9:
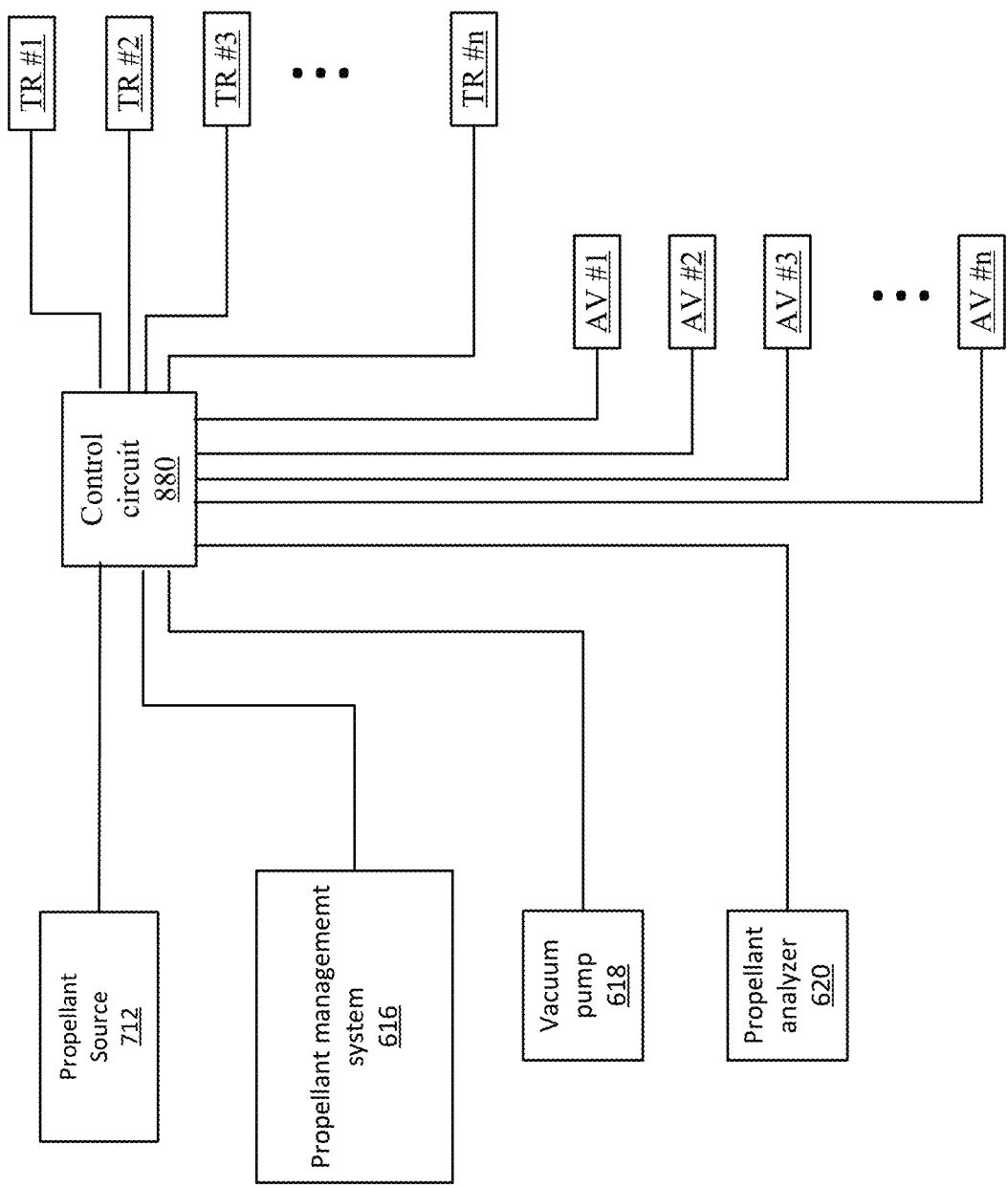
FIG. 9 shows an example of a schematic of components controlled by a control circuit.

In addition to controlling valves AV #1-AV #n as illustrated in FIG. 8, control circuits (e.g., control circuits 880) may control other components. FIG. 9 illustrates an example in which control circuit 880 is connected to transducers TR #1-TR #n and valves AV #1-AV #n as previously described and is additionally connected to propellant source 712, propellant management system 616, vacuum pump 618 and propellant analyzer 620 (e.g., connected by wires, connected wirelessly, or otherwise connected to allow digital or analog communication). This configuration allows control circuit 880 to receive information from these components and to control various operations for loading propellant in satellite propellant tanks.

Control circuit 880 may control one or more components of propellant source 712 in response to information (e.g., pressure measurements) received from propellant source 712 or elsewhere. For example, where propellant management system 616 includes a compressor (e.g., compressor 734 of FIG. 7A), control circuit 880 may control the compressor to maintain propellant in a predetermined range (e.g., turning compressor 734 on in response to propellant pressure dropping below a threshold pressure). Where propellant source 712 includes multiple propellant tanks in a cascade arrangement (e.g., propellant tanks 740-742 of FIG. 7C), control circuit 880 may monitor pressure of individual propellant tanks and may open and close valves (e.g., valves 750-752) accordingly. For example, as propellant pressure in a first propellant tank (e.g., propellant tank 740) drops below a predetermined pressure, control circuit 880 may switch off the valve of the first propellant tank (e.g., valve 750) and switch on the valve (e.g., valve 751) of a second propellant tank (e.g., propellant tank 741) to maintain propellant pressure in gas line 614.

Control circuit 880 may control one or more components of propellant management system 616 in response to information (e.g., pressure measurements) received from propellant management system 616 or elsewhere. For example, control circuit 880 may receive pressure readings from transducers of pressure gauges G1 (e.g., an upstream pressure transducer), G2 (e.g., a downstream pressure transducer) and G3 (vacuum pressure transducer) and may control regulator RG2 and automatic valves in place of manual valves MV1-MV5. Regulator RG2 may be controlled to maintain propellant pressure at pressure gauge G2 (e.g., downstream pressure transducer) in a desired range and valves may be opened and closed as needed to perform various operations (e.g., cleaning with a cleaning gas and pumping out cleaning gas or other gas) as described below.

Control circuit 880 may control vacuum pump 618 (and any valve connecting vacuum pump to propellant management system 616) in order to pump down propellant management system 616 to a sub-atmospheric pressure when desired. For example, control circuit 880 may turn vacuum pump 618 on and off in a series of pump-purge cycles or to achieve a vacuum level for a rate-of-rise test.

Control circuit 880 may control one or more components of propellant analyzer 620 (e.g., one or more components shown in FIG. 7E) and/or may receive information from one or more components of propellant analyzer 620 (e.g., real-time information regarding propellant from gas line 622 including one or more of pressure (from pressure gauges and regulation system 759), oxygen level (from oxygen sensor 764), moisture level (from moisture analyzer 766) and contaminant levels (from residual gas analyzer 768). For example, control circuit 880 may respond to a high level of oxygen, moisture, or contaminant by stopping flow of propellant to propellant tanks (e.g., closing one or more valves in propellant management system 616) and/or triggering an alarm or warning.

Control circuit 880 may be implemented in various ways. In some cases, more than one control circuit may be used (e.g., control circuit 880 may control valves AV #1-AV #n in response to information from transducers TR #1-TR #n, while one or more additional control circuit(s) may control components of propellant source 712, propellant management system 616, vacuum pump 618 and/or propellant analyzer). Control circuit 880 (and/or other control circuits) may be implemented using one or more Application Specific Integrated Circuit (ASIC), Programmable Logic Device (PLD), Field Programmable Gate Array (FPGA) or other such integrated circuit(s). In an example, control circuits may include a processor that is configured to perform specific functions (e.g., performing any of the operations of control circuit 880) by software.

Figure 10:
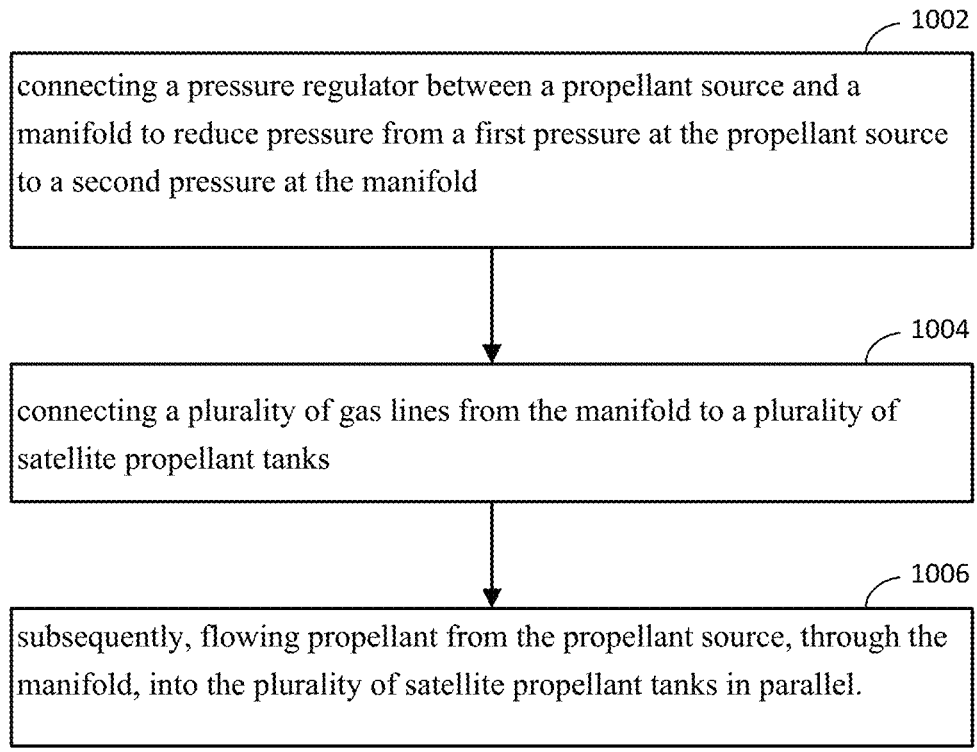
FIG. 10 shows an example of a method that includes flowing propellant to a plurality of satellite propellant tanks in parallel.

FIG. 10 shows an example of a method of filling a plurality of satellite propellant tanks in parallel (e.g., filling propellant tanks PT #1-PT #n). The method includes connecting a pressure regulator between a propellant source and a manifold to reduce pressure from a first pressure at the propellant source to a second pressure at the manifold 1002 (e.g., connecting pressure regulator RG2 between propellant source 712 and manifold 730) and connecting a plurality of gas lines from the manifold to a plurality of satellite propellant tanks 1004 (e.g., GL #1-GL #n). The method further includes flowing propellant from the propellant source, through the manifold, into the plurality of satellite propellant tanks in parallel 1006. In some cases, a compressor (optional) may be added to step up propellant at some point between the propellant source and the satellite propellant tanks (e.g., optional compressor 734 shown in FIG. 7A).

Prior to filling a plurality of satellite propellant tanks (e.g., using the method illustrated in FIG. 10), a system used to fill the satellite propellant tanks may be tested (e.g., for leaks) and may be cleaned (e.g., to remove oxygen, moisture, or other contaminants).

Figure 11:
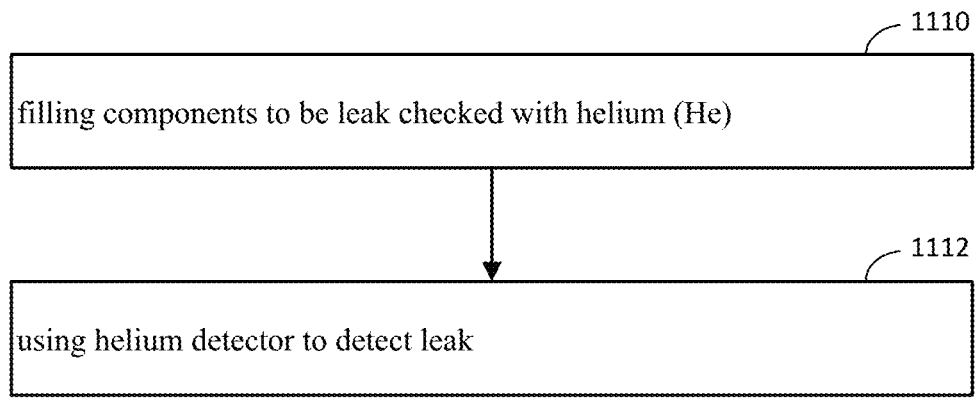
FIG. 11 shows an example of a method of leak checking.

FIG. 11 shows an example of a method of performing a leak check that includes filling the components to be leak checked with helium (He) 1110 (e.g., connecting a helium source instead of propellant source 712 and flowing helium through propellant management system to propellant tanks PT #1-PT #n) and using a helium detector to detect any leak 1112.

Figure 12:
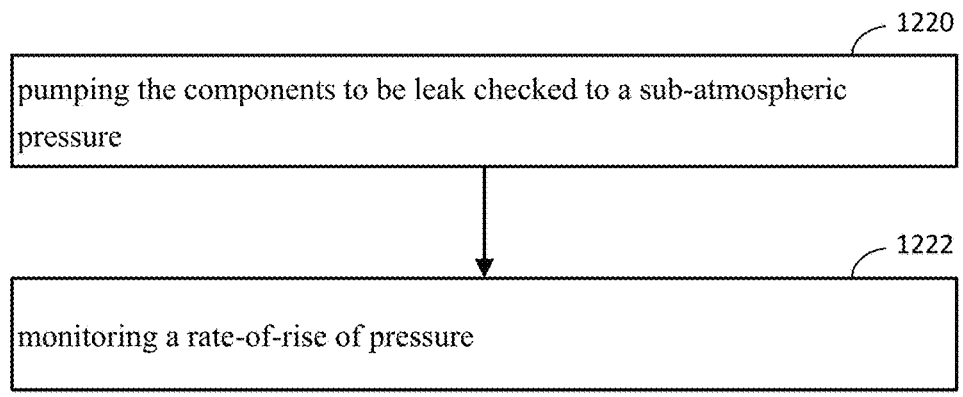
FIG. 12 shows another example of a method of leak checking.

FIG. 12 shows another example of a method of performing a leak check that includes pumping the components to be leak checked to a sub-atmospheric pressure 1220 and monitoring a rate-of-rise of pressure 1222 (e.g., using vacuum pump 618 to pump down propellant loading system 710, gas lines GL #1-GL #n and propellant tanks PT #1-PT #n to a first vacuum level, turning off or disconnecting vacuum pump 618, and monitoring pressure including measuring a second vacuum level after a time to obtain a rate-of-rise= (second vacuum level—first vacuum level)/time). The leak check of FIG. 12 may be performed manually or may be performed by control circuit 880 (e.g., controlling vacuum pump 618 and monitoring one or more transducers of gauges G1-G3).

Figure 13:
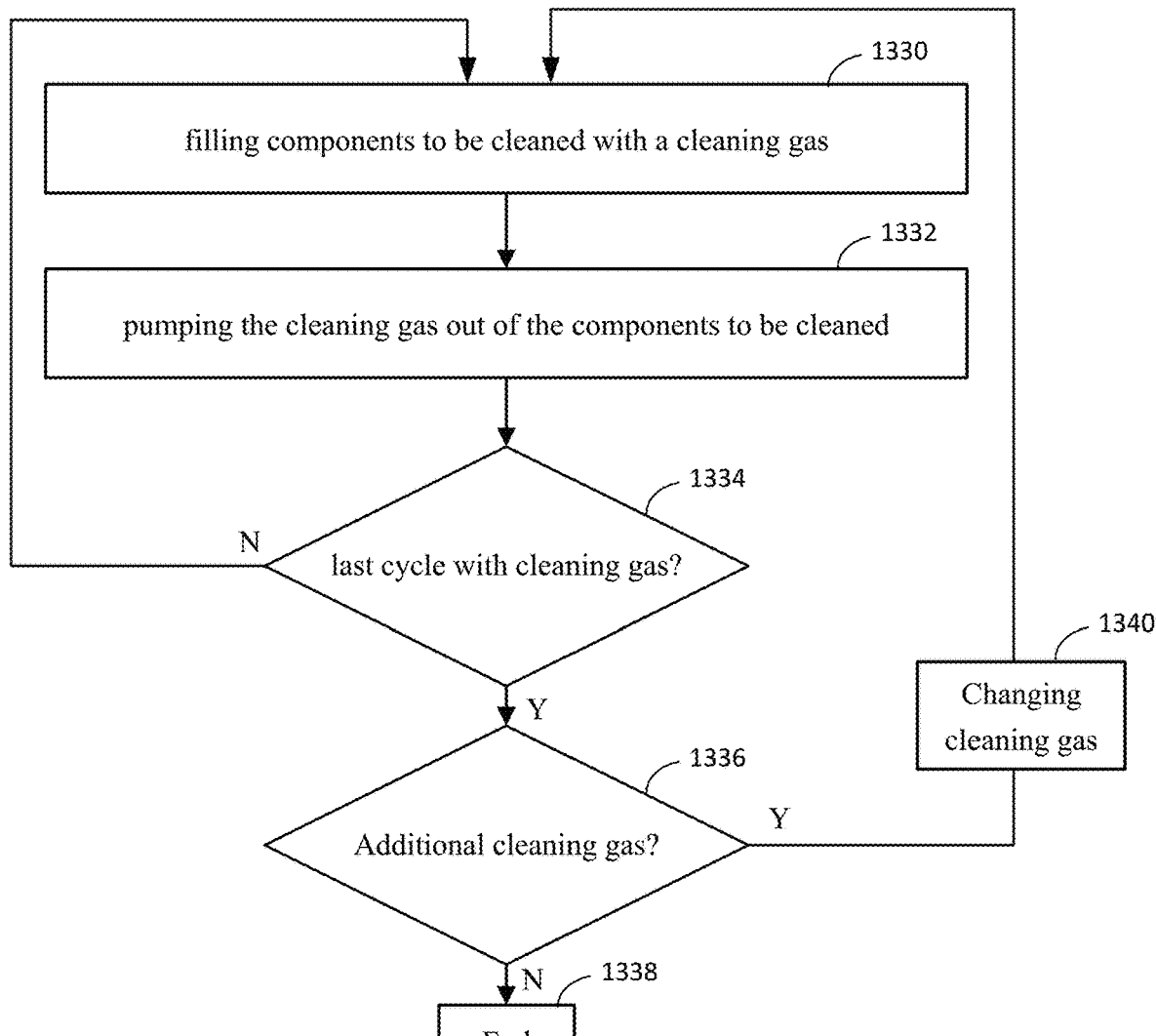
FIG. 13 shows an example of a method of cleaning with one or more cleaning gas.

FIG. 13 shows an example of a method of cleaning propellant loading system 710 (and/or additional components such as gas lines GL #1-GL #n and/or propellant tanks PT #1-PT #n) prior to loading propellant (e.g., after leak check(s) according to FIG. 11 and/or FIG. 12). The method includes filling components to be cleaned with a cleaning gas 1330 (e.g., argon) and subsequently pumping the cleaning gas out of the components to be cleaned 1332 (e.g., using vacuum pump 618 to pump down to a sub-atmospheric pressure). These steps may be repeated in one or more cycles (e.g., three pump-purge cycles with argon as a cleaning gas). In each cycle, a determination is made as to whether the present cycle is the last cycle with the current cleaning gas 1334. If it is not the last cycle, then steps 1330 and 1332 are repeated for at least another cycle. If it is the last cycle, then a determination is made as to whether another cleaning gas is to be used 1336. For example, after cleaning with argon over one or more cycles, one or more additional cycles may be performed using Krypton as the cleaning gas. If an additional cleaning gas is to be used, then the method includes changing the cleaning gas 1340 (e.g., switching from argon to krypton) and additional pump-purge cycle(s) may be performed. If no additional cleaning gas is to be used, then the process ends. In an example, three pump-purge cycles are performed with argon followed by three pump-purge cycles with Krypton. In another example, the only cleaning gas used may be the propellant (e.g., Krypton).

An example apparatus includes an inlet to connect to a propellant source; a pressure regulator connected to the inlet to reduce propellant pressure from a first pressure at the inlet to a second pressure; a manifold connected to the pressure regulator to receive propellant from the pressure regulator at the second pressure, the manifold including a plurality of manifold outlets; and a plurality of gas lines, each gas line extending from a corresponding manifold outlet for connection to a corresponding satellite propellant tank.

The apparatus may include a plurality of connectors, each connector at an end of a respective gas line for connection to a fill valve of the corresponding satellite propellant tank. The apparatus may include a plurality of transducers, each transducer attached to a corresponding gas line to provide information regarding the propellant in the corresponding gas line. The apparatus may include a plurality of valves and a control circuit, each valve connected to a corresponding gas line to control gas flow in the corresponding gas line under control of the control circuit. The control circuit may be connected to the plurality of transducers, the control circuit may be configured to cause a valve of the plurality of valves to shut in response to a corresponding transducer indicating that a propellant tank connected to the corresponding gas line is full. The propellant source may include one or more tanks of propellant. The propellant source may further include a propellant compressor to increase pressure from the propellant source to the first pressure at the inlet. The one or more tanks of propellant may consist of one or more tanks of Krypton or Xenon. The one or more tanks of propellant may consist of one or more tanks of Krypton at an initial pressure of about 6000 pounds per square inch (psi) or more. The pressure regulator may be configured to reduce pressure from the first pressure of about 6000 psi to the second pressure of about 3000 psi.

An example of a method of filling a plurality of satellite propellant tanks in parallel includes connecting a pressure regulator between a propellant source and a manifold to reduce pressure from a first pressure at the propellant source to a second pressure at the manifold; connecting a plurality of gas lines from the manifold to a plurality of satellite propellant tanks; and subsequently, flowing propellant from the propellant source, through the manifold, into the plurality of satellite propellant tanks in parallel.

The method may further include, prior to flowing the propellant into the plurality of satellite propellant tanks, leak checking a series of components between the propellant source and the plurality of satellite propellant tanks. The leak checking may include at least one of filling the series of components with helium (He) and using a helium detector and pumping the series of components to a sub-atmospheric pressure and monitoring a rate-of-rise of pressure in the series of components over a period of time. The method may include prior to flowing the propellant into the plurality of satellite propellant tanks, filling the series of components between the propellant source and the plurality of satellite propellant tanks with a cleaning gas and pumping the cleaning gas out of the series of components with a vacuum pump. The method may include alternately filling the series of components and pumping out the series of components in a plurality of pump-purge cycles.

An example apparatus includes an inlet to connect to a propellant source; a pressure regulator connected to the inlet to reduce propellant pressure from a first pressure at the inlet to a second pressure; a manifold connected to the pressure regulator to receive propellant from the pressure regulator at the second pressure, the manifold including a plurality of manifold outlets; a plurality of gas lines, each gas line extending from a corresponding manifold outlet for connection to a corresponding satellite propellant tank; a plurality of pressure transducers, each pressure transducer attached to a respective gas line of the plurality of gas lines to measure pressure of a corresponding satellite propellant tank; a plurality of valves, each valve attached to a respective gas line of the plurality of gas lines to control flow in the respective gas line; and a control circuit connected to the plurality of pressure transducers and the plurality of valves to turn off a valve connected to a gas line in response to a pressure measurement from the pressure transducer attached to the gas line exceeding a threshold pressure.

The apparatus may include an upstream pressure transducer connected between the inlet and the pressure regulator; a downstream pressure transducer connected between the pressure regulator and the manifold; wherein the control circuit is connected to the upstream pressure transducer, the downstream pressure transducer and the pressure regulator; and the control circuit is configured to control the pressure regulator in response to pressure measurements from the upstream pressure transducer and the downstream pressure transducer to maintain pressure at the downstream pressure transducer in a predetermined range. The apparatus may further include a vacuum pump connected to the pressure regulator to evacuate a volume on at least one side of the pressure regulator and wherein the control circuit is configured to cause the vacuum pump to pump the volume to a sub-atmospheric pressure and monitor a rate-of-rise of pressure of the volume to detect if a leak is present. The control circuit may be configured to control the vacuum pump to alternately, in a plurality of cycles, flow a cleaning gas into the volume and pump the volume to a sub-atmospheric pressure. The apparatus may include a propellant compressor connected to the control circuit, wherein the control circuit is configured to control the propellant compressor to maintain propellant pressure at the upstream pressure transducer above a predetermined pressure.

Note that the discussion above introduces many different features and many embodiments. It is to be understood that the above-described embodiments are not all mutually exclusive. That is, the features described above (even when described separately) can be combined in one or multiple embodiments.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. An apparatus comprising:
    an inlet connected to a propellant source that contains propellant at a first pressure;
    a pressure regulator having an upstream side connected to the inlet and a downstream side, the pressure regulator configured to reduce propellant pressure from the first pressure at the inlet to a second pressure at the downstream side;
    a manifold connected to the downstream side of the pressure regulator such that the propellant from the pressure regulator fills the manifold at the second pressure, the manifold including a plurality of manifold outlets;
    a plurality of gas lines, each gas line extending from a corresponding manifold outlet, each gas line terminating at a corresponding connector that has features configured for connection to corresponding features of a fill valve of a corresponding satellite propellant tank that is located in a corresponding satellite; and
    a plurality of satellites, each satellite having a satellite propellant tank with a fill valve connected to a corresponding connector.

2. The apparatus of claim 1, wherein each gas line is a flexible gas line and each connector has a threaded surface for connection to a threaded fitting of a corresponding fill valve.

3. The apparatus of claim 1, further comprising a plurality of transducers, each transducer configured to provide information regarding at least one of pressure of the propellant in the corresponding gas line and mass of the propellant in the satellite propellant tank.

4. The apparatus of claim 3, further comprising a plurality of valves and a control circuit, each valve connected to a corresponding gas line to control gas flow in the corresponding gas line under control of the control circuit.

5. The apparatus of claim 4, wherein the control circuit is connected to the plurality of transducers, the control circuit is configured to cause a valve of the plurality of valves to shut in response to a corresponding transducer indicating that a propellant tank connected to the corresponding gas line is full.

6. The apparatus of claim 1, wherein the propellant source includes two or more tanks of propellant in a cascade arrangement.

7. The apparatus of claim 6, further comprising a propellant compressor to increase pressure from the propellant source to the manifold.

8. The apparatus of claim 6, wherein the one or more tanks of propellant consist of one or more tanks of Krypton or Xenon.

9. The apparatus of claim 8, wherein the one or more tanks of propellant consist of one or more tanks of Krypton at an initial pressure of about 6000 pounds per square inch (psi) or more.

10. The apparatus of claim 9, wherein the pressure regulator is configured to reduce pressure from the first pressure of about 6000 psi to the second pressure of about 3000 psi.

11. A method of filling a plurality of satellite propellant tanks in parallel comprising:
    providing a plurality of satellites;
    connecting a pressure regulator between a propellant source supplying propellant at a first pressure and a manifold containing the propellant at a second pressure, the pressure regulator reducing pressure from the first pressure at the propellant source to the second pressure at the manifold;
    connecting a plurality of gas lines from the manifold to a plurality of fill valves of satellite propellant tanks, each satellite propellant tank connected to one or more thrusters of a corresponding satellite of the plurality of satellites, by coupling connectors at ends of the plurality of gas lines with the plurality of fill valves;
    subsequently, flowing propellant from the propellant source, through the manifold, into the plurality of satellite propellant tanks in parallel; and
    subsequently flowing the propellant from each satellite propellant tank to power thrusters of the corresponding satellite.

12. The method of claim 11, further comprising, prior to flowing the propellant into the plurality of satellite propellant tanks, leak checking a series of components between the propellant source and the plurality of satellite propellant tanks.

13. The method of claim 12, wherein the leak checking includes at least one of filling the series of components with helium (He) and using a helium detector and pumping the series of components to a sub-atmospheric pressure and monitoring a rate-of-rise of pressure in the series of components over a period of time.

14. The method of claim 12, further comprising, prior to flowing the propellant into the plurality of satellite propellant tanks, filling the series of components between the propellant source and the plurality of satellite propellant tanks with a cleaning gas and pumping the cleaning gas out of the series of components with a vacuum pump.

15. The method of claim 12, further comprising alternately filling the series of components and pumping out the series of components in a plurality of pump-purge cycles.

16. An apparatus comprising:
    a plurality of satellites;
    an inlet connected to a propellant source;
    a pressure regulator having an upstream side connected to the inlet and a downstream side, the pressure regulator configured to reduce propellant pressure from a first pressure at the inlet to a second pressure;
    a manifold connected to the downstream side of the pressure regulator such that propellant from the pressure regulator fills the manifold at the second pressure, the manifold including a plurality of manifold outlets;
    a plurality of gas lines, each gas line extending from a corresponding manifold outlet, each gas line terminating at a corresponding connector that is connected to a fill valve of a satellite propellant tank located in a corresponding satellite of the plurality of satellites;

a plurality of pressure transducers, each pressure transducer attached to a respective gas line of the plurality of gas lines to measure pressure of a corresponding satellite propellant tank;

a plurality of valves, each valve attached to a respective gas line of the plurality of gas lines to control flow in the respective gas line; and a control circuit connected to the plurality of pressure transducers and the plurality of valves to turn off a valve connected to a gas line in response to a pressure measurement from the pressure transducer attached to the gas line exceeding a threshold pressure.

17. The apparatus of claim 16 further comprising:

an upstream pressure transducer connected between the inlet and the pressure regulator;

a downstream pressure transducer connected between the pressure regulator and the manifold;

wherein the control circuit is connected to the upstream pressure transducer, the downstream pressure transducer and the pressure regulator; and the control circuit is configured to control the pressure regulator in response to pressure measurements from the upstream pressure transducer and the downstream pressure transducer to maintain pressure at the downstream pressure transducer in a predetermined range.

18. The apparatus of claim 16 further comprising a vacuum pump connected to the pressure regulator to evacuate a volume on at least one side of the pressure regulator and wherein the control circuit is configured to cause the vacuum pump to pump the volume to a sub-atmospheric pressure and monitor a rate-of-rise of pressure of the volume to detect if a leak is present.

19. The apparatus of claim 18 wherein the control circuit is configured to control the vacuum pump to alternately, in a plurality of cycles, flow a cleaning gas into the volume and pump the volume to a sub-atmospheric pressure.

20. The apparatus of claim 17, wherein the inlet, the pressure regulator, the manifold and the control circuit are located on a cart and the plurality of gas lines extend from the cart to the corresponding satellites.

* * * * *